United States Patent Office 3,438,409
Patented Apr. 15, 1969

3,438,409
APPARATUS FOR TRANSFERRING
ANTIKNOCK FLUID
Robert S. Bruce, Houston, Tex., and John C. Watt, Kew Gardens, N.Y., assignors to Ethyl Corporation, New York, N.Y., a corporation of Virginia
Filed Feb. 18, 1966, Ser. No. 528,591
Int. Cl. B65b 31/02; B67c 3/16; B01d 45/00
U.S. Cl. 141—59                                 3 Claims

ABSTRACT OF THE DISCLOSURE

Transferring antiknock fluid concentrate from one vessel to another by vacuum wherein generated and displaced fluid vapors are absorbed in the hydrocarbon sealant for a liquid seal vacuum pump, the resulting hydrocarbon sealant solution and air are separated, uncontaminated air discharged to the atmosphere and the recovered hydrocarbon sealant and antiknock concentrate are added to a gasoline stream.

Background of the invention

Figure 1:
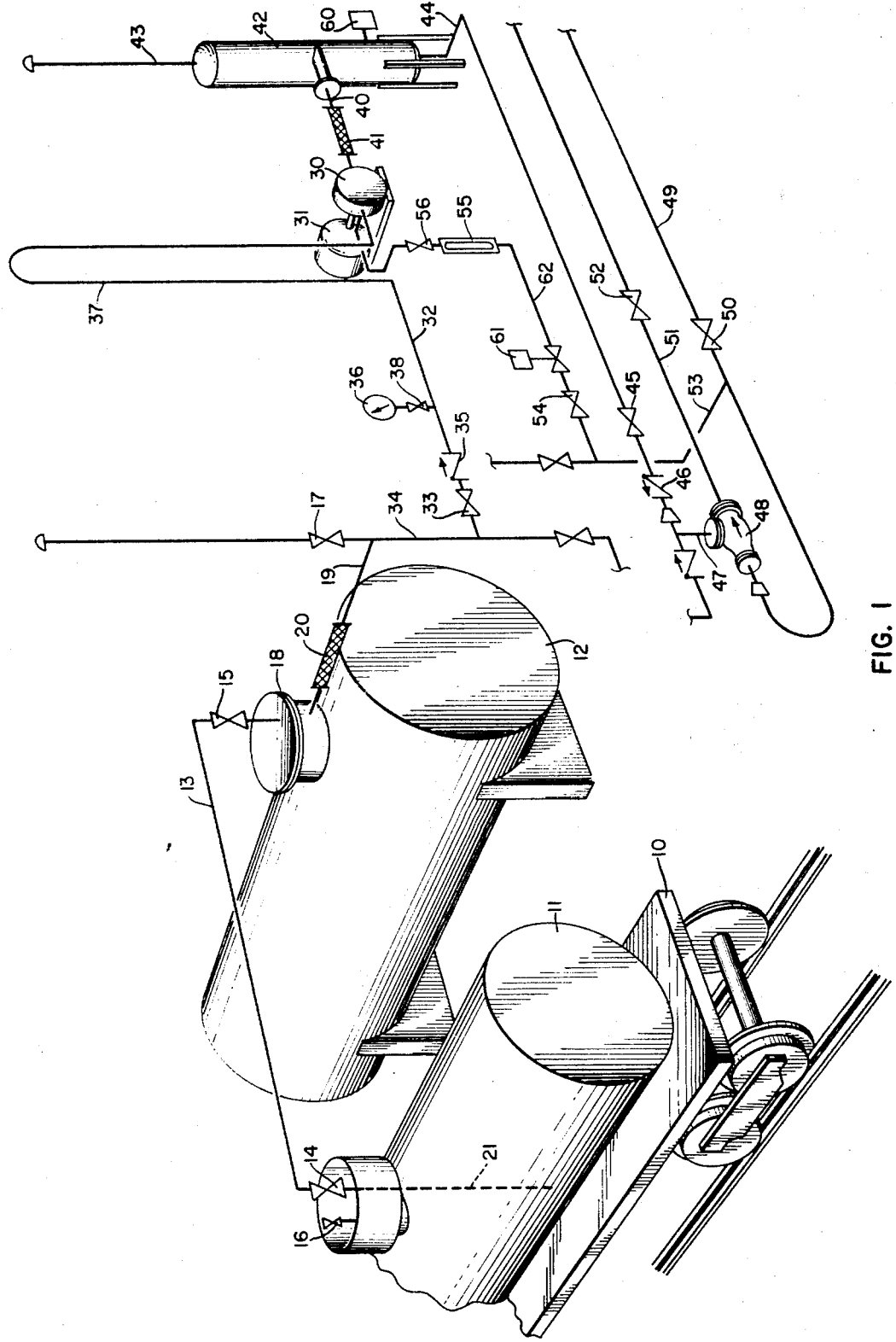

The expanding need of industry for large volumes of chemical fluids at competitive prices requires the bulk shipment of these fluids in large vessels or containers such as barges and tank cars. These bulk quantities of fluids must be transferred from the large vessels to smaller ones, such as tank trucks or storage vessels, at points of distribution. Generally, bulk quantities of chemical fluids are transfered from one vessel to another by applying inert gas pressure, such as nitrogen, to the surface of the fluid within the large vessel or tank car and forcing the fluid up a standpipe within the vessel to another vessel such as a tank truck placed adjacent thereto.

Operation in this manner creates problems, however, in that an inert gas supply must be maintained in high pressure containers, and during the transfer, chemical fluid vapors formed within the receiving vessel are displaced to the surrounding atmosphere by the transferring liquid. These displaced vapors generally collect in high concentrations around the vessels and may create a fire or health hazard to equipment and personnel.

It is an object of this invention to provide a process and apparatus for transferring combustible or toxic fluids from one vessel to another without contaminating the atmosphere.

Another object of the invention is to provide a process and apparatus for transferring combustible or toxic fluids wherein displaced fluid vapors are absorbed.

A further object of the invention is to provide a proc- wherein displaced fluid vapors are absorbed.

A further object of the invention is to provide a process and apparatus for transferring combustible or toxic fluids by a self-contained means.

A still further object of the invention is to provide a process and apparatus for transferring fluids from one vessel to another in a simple, economical and safe manner.

These and other objects of this invention will become readily apparent upon reference to the following description and accompanying drawing in which, FIG. 1 is an embodiment of an installation for transfering fluids from one vessel to another.

Referring now to FIG. 1, there is shown tank car 10 having tank car vessel 11 connected wtih collection vessel 12 by line 13 having tank car vessel valve 14 and collection vessel valve 15. Standpipe 21 is connected with valve 14 for removing liquid from vessel 11. Air vent valve 16 is provided on tank car vessel 11 and collection vessel vent valve 17 is connected with top portion 18 of collection vessel 12 by line 19 having vapor velocity reducer 20.

Liquid seal vacuum pump 30 having motor driving means 31 is connected with line 19 by line 32 through valve 33 and line 34. Suitable check valve 35 and vacuum gauge 36 having shutoff valve 38, as well as vacuum seal loop 37, may be provided in line 32 if desired. Vacuum pump exhaust line 40 having expansion section 41 connects vacuum pump exhaust with liquid-vapor separator 42.

Liquid vapor separator 42 has vapor vent line 43 at the top and liquid removal line 44 at the bottom connected through valve 45 and check valve 46 to educator intake line 47.

Eductor 48 may be supplied fuel such as gasoline through fuel supply line 49 by means of valve 50 and the fuel and other liquids entering eductor 48 by line 47 are exhausted therefrom by line 51 having valve 52.

Liquid sealant for vacuum pump 30 is supplied from eductor fuel line 49 by sealant line 53 through valve 54, and the flow of liquid sealant may be observed by rotameter 55 and controlled by valve 56. Liquid level and alarm control device 60 may be provided on liquid-vapor separator 42 operatively connected with shutoff valve 61 to discontinue automatically the flow of liquid sealant in line 62 through rotameter 65 and valve 56 if the level of separated liquid collected in liquid-vapor separator 42 becomes too high.

The process of this invention for transferring liquid from a first liquid containing vessel to a second vessel comprising, in combination, the steps of (a) Providing a substantially vacuum-tight connection between substantially the bottom of the inside of said first vessel and the inside of said second vessel;

(b) Providing a substantialy vacuum-tight connection between the inside of substantially the top of said second vessel and the vacuum intake means of an operating liquid-seal vacuum pump;

(c) Supplying from about 0.2 to about 5.0 gallons per minute of a hydrocarbon liquid sealant to said operating liquid-seal vacuum pump; and (d) Maintaining the provided vacuum-tight connections of items (a) and (b) above and the flow of said sealant of item (c) above for a period sufficient to transfer a desired quantity of liquid from said first vessel to said second vessel;

may be shown most clearly by a description of the operating procedure for a preferred embodiment of the invention as shown in FIG. 1. Assuming all valves of the apparatus are closed and all apparatus is stationary, load line 13 is connected with tank car vessel standpipe 21 through valve 14 and vessel 12 through valve 15.

Next, the operation of eductor 48 may be started by opening eductor exhaust valve 52 and eductor fuel valve 50. With a flow of hydrocarbon proceeding through eductor 48, vacuum pump 30 is started by motor means 31, and vacuum gauge valve 38 is opened to permit operation of vacuum gauge 36 to show vacuum in line 32. Liguid-vapor separator valve 45 is then opened and liquid sealant valve 54 is opened permitting a flow of liquid sealant to the vacuum pump through rotameter 55 which flow may be controlled by valve 56 at a rate of between from about 0.2 and about 5.0 gallons per minute and more preferably from about 0.5 to about 3.0 gallons per minute. With vacuum pump 30 operating at approximately 20 inches of mercury vacuum, as indicated by gauge 36, valve 33 may be opened permitting the evacuation of lines 34 and 19 and vessel 12.

With operation in this manner proceeding properly, transfer of fluid from vessel 11 to vessel 12 may be effected by opening vessel valve 15, tank car vessel valve 14 and air vent valve 16. The vacuum created in vessel 12 by vacuum pump 30 permits atmospheric pressure entering vessel 11 to force the liquid therein up through standpipe 21 into vessel 12, and vapors present and generated in tank 12 during the transfer are absorbed from the fluid entering vacuum pump inlet by the hydrocarbon sealant. The mixture of nonabsorbed gas and hydrocarbon solution are separated in the liquid-vapor separator 42 with gas, such as air, being discharged to the atmosphere through vent line 43. The hydrocarbon sealant and dissolved vapors are removed from the liquid-vapor separator 42 through line 44 and exhausted safely from the area by the eductor 48 through line 52.

A typical application where the process and apparatus of this invention may be used advantageously is in the transfer of antiknock fluid concentrates from tank cars to fixed tanks or tank trucks.

Antiknock fluid concentrates may contain volatile lead compounds such as tetraethyl lead, tetramethyl lead and mixed lead alkyls in high concentration in a hydrocarbon solvent. For such an application, the motor driven vacuum pump produces a vacuum in the storage tank during unloading by pulling contaminated air from the storage tank. A continuously flowing stream of gasoline enters suction side of the vacuum pump and is discharged with the air. This gasoline forms a liquid seal around the periphery of the pump bowl insuring high pump efficiency, and intimate gasoline to air contact within the pump permits the toxic lead vapors in the air to be absorbed in the gasoline. Thus, the air discharged is essentially free of lead compounds and presents no safety hazard.

For such an installation, a liquid seal vacuum pump having a capacity of approximately 30 cubic feet per minute at 20 inches of mercury has been found to be adequate; however, it is clear that any vacuum pump suitable for providing the necessary vacuum in this system and having means for providing a liquid sealant to the vacuum pump will be adequate.

The liquid-vapor separator should be designed to remove substantially completely any entrained liquid from the air vented from the vacuum pump, and in the typical installation described above, the liquid-vapor separator may have the inlet nozzle mounted tangentially on the separator body to facilitate the separation of the sealant liquid from the vapors entering the separator. The excess vapors may pass up through wire mesh demister elements arranged in series for mechaical removal of any vapor droplets and then the air is vented to the atmosphere. The sealant liquid and the absorbed vapors are removed from the bottom of the separator and are discharged into the inlet or vacuum side of the eductor. The liquid sealant used for the vacuum pump may be any liquid suitable for dissolving or absorbing the contaminant vapors present or generated during the transfer of the liquids, and in the typical application described it has been found that a hydrocarbon liquid such as a gasoline may be used advantageously.

The flow rate of the liquid sealant may be set at any rate necessary to effect the desired absorption of the contaminating material in the exhausting vapor, and in the typical application it has been found that when a gasoline is used as the hydrocarbon sealant during the transfer of antiknock fluid concentrates a flow rate of from about 0.2 to about 5 gallons per minute is adequate and from about 0.5 to about 3 gallons per minute flow is preferred when using a vacuum pump of the type and capacity described above.

An eductor is a jet pump which operates by means of a liquid jet to pump a second liquid stream. An eductor for the process and apparatus of this invention is a particular type of jet pump which uses liquid both as the motive and the entrained fluid and which discharges the liquid at a pressure intermediate between the motive and the suction pressures.

The advantages of the process and apparatus of this invention are many. The system is substantially self-contained and there is no need to supply extra equipment such as nitrogen generating equipment or bottled nitrogen or other inert gas to effect the transfer. Contaminating vapors are not permitted to accumulate in the area of the transfer of the liquid so that health and fire hazards are reduced to a minimum. The continuously flowing sealant stream through the vacuum pump, the liquid-vapor separator and the eductor eliminate the use of sealant holdup tanks and scrubbing towers where solutions having dangerously high concentrations of absorbed contaminating materials may accumulate. This feature is especially important where volatile tetraalkyl lead compounds are unloaded.

We claim:
1. A self-filling vessel apparatus comprising, in combination,
 (a) a closed vessel having at least two openings at substantially the top;
 (b) a liquid seal vacuum pump having vacuum intake means, exhaust means, motor drive means and liquid-sealant supply means;
 (c) a substantially vacuum-tight vapor conducting means connecting one of said at least two openings and said vacuum intake means;
 (d) said exhaust means being fluid transmittantly connected with a liquid-vapor separator means for separating substantially all the liquid from the vapor in the vacuum pump exhaust;
 (e) said liquid-vapor separator means having a gas discharge means and a liquid discharge means and said liquid discharge means being fluid transmittantly connected with the vacuum intake means of an eductor; and
 (f) said liquid-vapor separator means having liquid level control means operatively connected with said liquid-sealant supply means to control the flow of liquid sealant from said supply means to maintain a predetermined liquid level in said liquid-vapor separator means.

2. The apparatus of claim 1 further characterized by said liquid-vapor separator having a vertical substantially cylindrical body with an inlet means mounted substantially tangentially to said cylindrical body for receiving exhaust from said liquid-seal vacuum pump exhaust means and having a demister means mounted above said inlet means for removing vapor droplets from the gas in said liquid-vapor separator means before said gas is discharged to the atmosphere.

3. The apparatus of claim 1 further characterized by said liquid sealant being gasoline and said eductor being gasoline operated.

References Cited
UNITED STATES PATENTS

| | | | |
|---|---|---|---|
| 3,011,638 | 12/1961 | Glover. | |
| 2,144,613 | 1/1939 | Broadhurst. | |
| 2,230,405 | 2/1941 | Jennings | 230—79 |
| 2,850,439 | 9/1958 | Bobkin | 137—409 X |
| 3,045,716 | 7/1962 | Morgan et al. | 141—7 |
| 3,289,918 | 12/1966 | Adams | 230—79 |

LAVERNE D. GEIGER, *Primary Examiner.*

EDWARD J. EARLS, *Assistant Examiner.*

U.S. Cl. X.R.
103—113; 137—205; 230—79

U.S. DEPARTMENT OF COMMERCE

PATENT OFFICE

Washington, D.C. 20231

UNITED STATES PATENT OFFICE
CERTIFICATE OF CORRECTION

Patent No. 3,438,409                                                      April 15, 1℃

Robert S. Bruce et al.

It is certified that error appears in the above identified patent and that said Letters Patent are hereby corrected as shown below:

Column 1, lines 52 and 53, cancel "A further object of the invention is to provide a proc- wherein displaced fluid vapors are absorbed.". Column 2 line 11, "educator" should read -- eductor --; line 33, "substantialy" should read -- substantially --; line 58, "Liguid" should read -- Liquid --

Signed and sealed this 14th day of April 1970.

(SEAL)
Attest:

Edward M. Fletcher, Jr.
Attesting Officer

WILLIAM E. SCHUYLER, JF
Commissioner of Patents